3,302,866
HIGH VELOCITY FLUID ACCELERATOR
Antonio Ferri, Rockville Centre, N.Y., assignor to Polytechnic Institute of Brooklyn, Brooklyn, N.Y., a corporation of New York
Filed Mar. 16, 1965, Ser. No. 440,111
6 Claims. (Cl. 230—117)

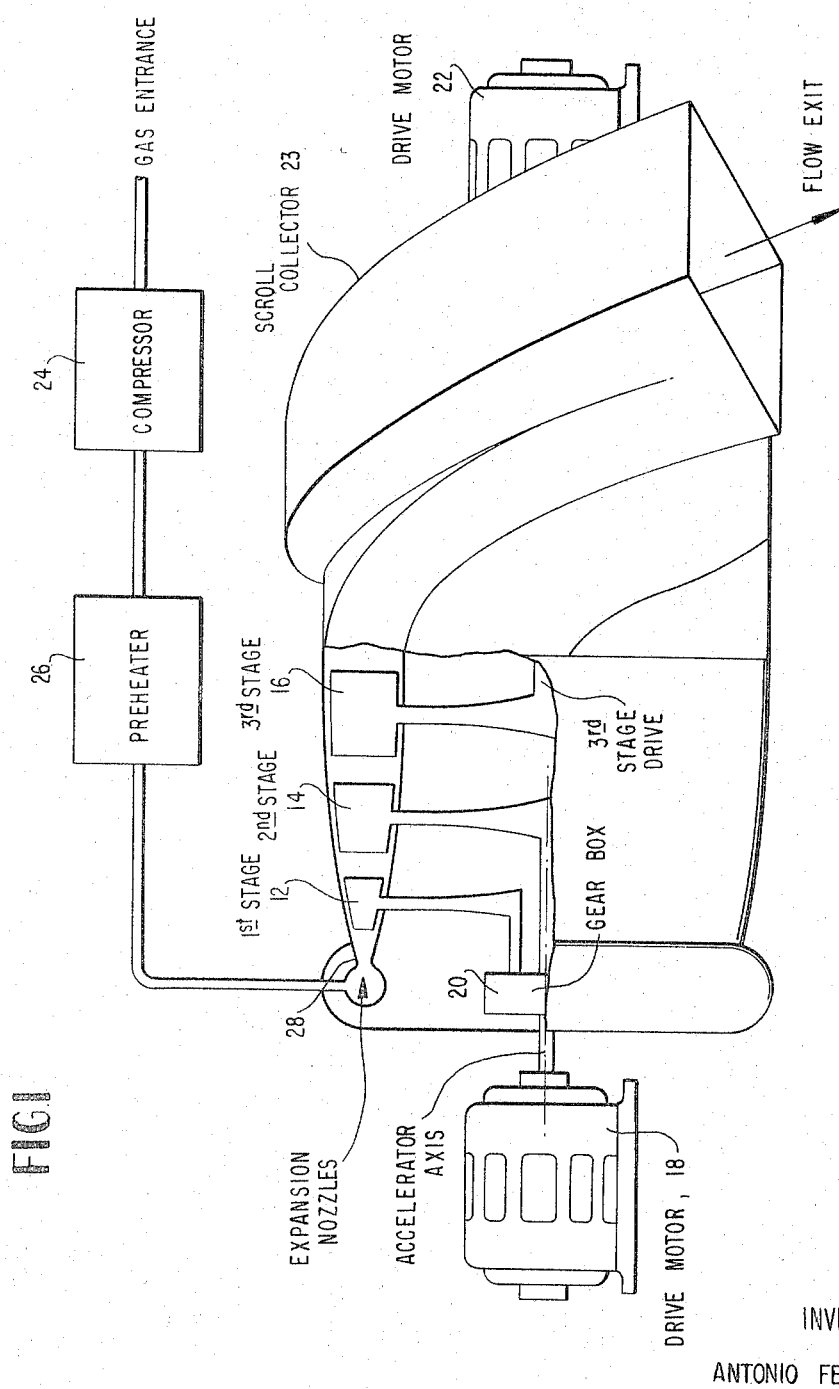

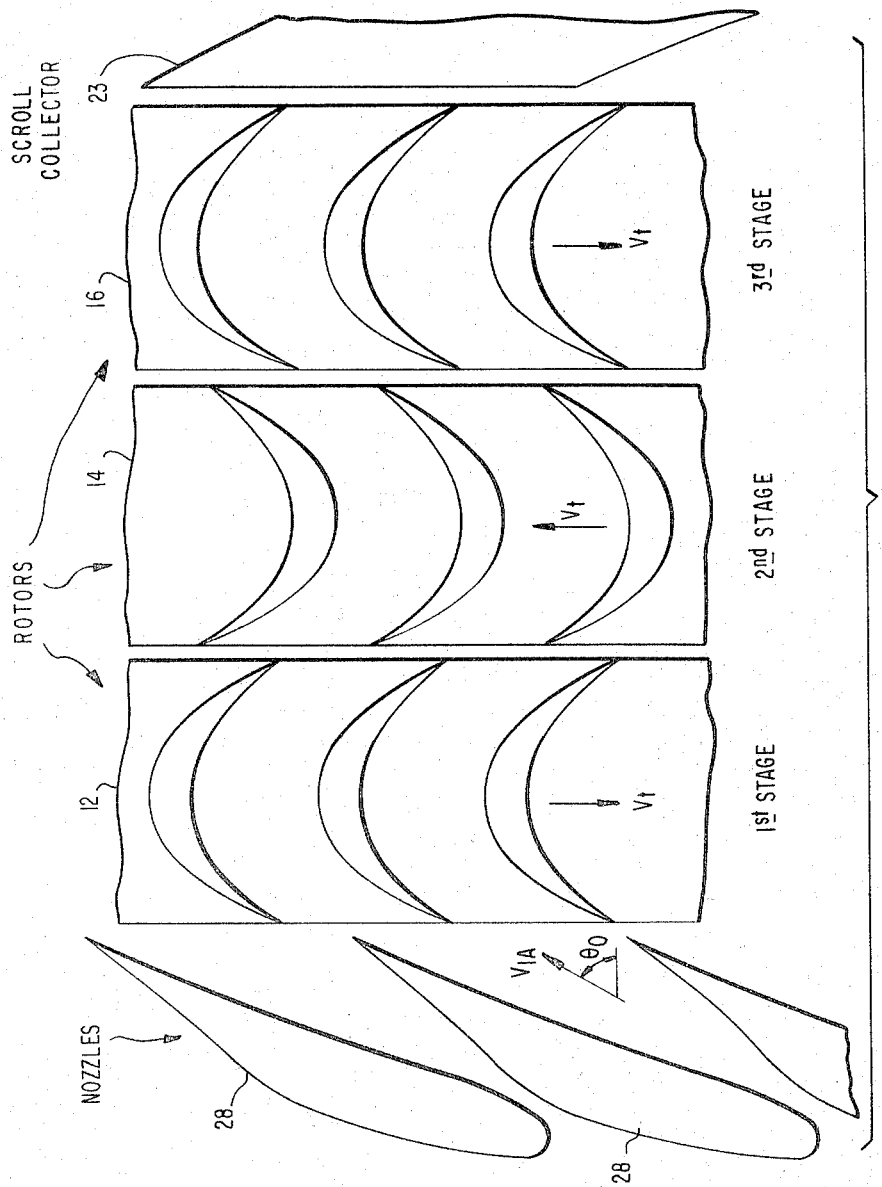
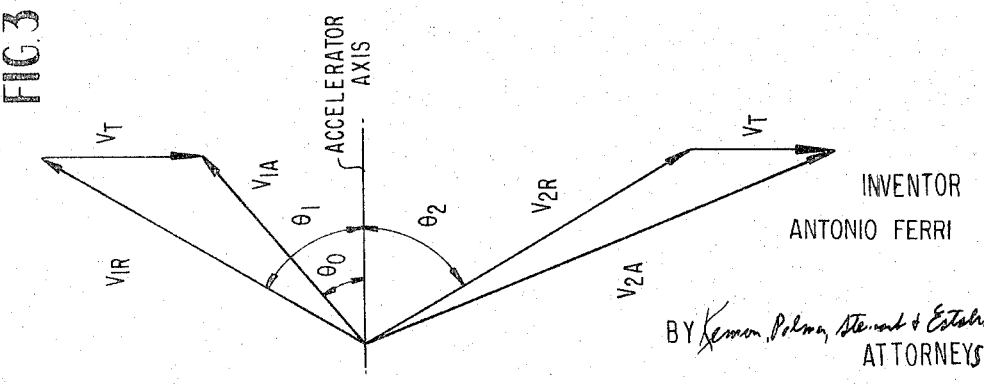
INVENTOR
ANTONIO FERRI
BY *Keenan, Palmer, Stewart & Estabrook*
ATTORNEYS United States Patent Office 3,302,866
Patented Feb. 7, 1967

This invention relates to a method and apparatus for the supersonic acceleration of air or other fluids. More particularly, the present invention relates to the supersonic acceleration of air or other fluids with only very small changes in static pressure and static temperature during the process.

While the method and apparatus of the present invention will be useful in connection with the supply of high velocity fluids to wind tunnels for test purposes and the like, its use is not so limited. In addition to its application to wind tunnels, this invention is also useful for the actual production of certain materials which require high temperatures and pressures. In the latter case, raw material would be introduced upstream of the accelerator to be energized thereby and then slowed down in a diffuser which would increase the pressure and temperature to the degree required for the formation of desired products or reaction.

Insofar as aerodynamic test facilities are concerned, those known to the prior art can generally be classified in two major categories. The first of these is the ballistic range or counterflow type of facility in which the test vehicle is in motion. The second known type is the standard wind tunnel in which the test model is stationary. In so-called fixed model facilities, known apparatus is effective to provide high enthalpy and short test duration or lower enthalpy and relatively long test times. Shock tubes, shock tunnels, expansion tubes and "hot shot" heaters are typical examples of the testing techniques of the ballistic range or counterflow type of facility. For standard wind tunnels where the test vehicle is stationary, apparatus useful to produce the required fluid flow includes pebble bed heaters, electrical resistance heaters, arc jets, and the "wave super heater." For very short test duration facility (the order of several milliseconds), extremely high values of both stagnation pressures and temperatures have been achieved. The limited time duration of the test, however, precludes the use of such facilities for certain desired types of testing. For example, in tests involving combustion, the useful run length may not be sufficient to establish a steady burning process due to ignition delay and reaction times. In dynamic stability studies, the times involved in changing the model attitude are of necessity much longer than the available flow times and, therefore, the amount of useful data obtainable is severely limited. With this as a background, it is evident that there is need for a high enthalpy, high pressure test facility which is capable of run durations of the order of at least several seconds. The presently available facilities which can provide run times of this order of magnitude do not furnish the desired capability in terms of velocity and pressure and particularly at the higher pressure levels.

As a result of all of these difficulties, various techniques have been investigated in an attempt to accelerate any previously established supersonic flow without recourse to the standard expansion technique. In accordance with the present invention, the desired acceleration of a supersonic fluid flow is achieved by means of an axial flow supersonic compressor and, of course, without the use of electrostatic or magnetic fields.

Accordingly, it is the principal object of the present invention to accelerate a supersonic flow by mechanical means.

A further object is to accelerate a supersonic flow through the use of a supersonic impulse type compressor.

A still further object of the present invention is to achieve a greatly accelerated supersonic fluid flow at conditions of substantially constant static temperature and pressure.

It is believed that a complete understanding of the present invention may be had by reference to the attached drawings in connection with the following detailed description. In the drawings:

FIGURE 1 is a schematic view partially in section of the general arrangement of a mechanical accelerator in accordance with the present invention.

FIGURE 2 is a schematic representation of the inlet nozzles and the rotor blading of the mechanical compressor shown in FIGURE 1, and FIGURE 3 is a vector velocity diagram of the flow through a flow system of the type shown in FIGURE 2.

In general, the objects of the present invention are achieved by use of a mechanical positively driven compressor, the rotor blades of which are effective to turn the flow through a large angle. The turning angle should be more than 90° and may be of the order of 120°. No stator blades are used in the intermediate stages, but injection stator nozzles are used to inject fluid at supersonic velocity into the first rotor fluid flow path. The principles of the present invention are applicable equally to single and multistage machines but most of the description which follows will relate to a three-stage machine in which adjacent stages are positively driven in opposite directions.

Referring first to FIGURE 1, this a schematic showing of a mechanical accelerator in accordance with the present invention, and it will be seen that within the housing 10 there are three rotors on a common axis comprising three rotor stages, and these are designated 12, 14 and 16. A first drive motor 18 is connected to rotors 12 and 14 through a gear box 20. A second drive motor 22 is connected to the third stage rotor 16. As indicated in FIGURE 2, the three stages are driven in opposite directions. Spaced axially downstream of the rotor stages, there is preferably a scroll collector 22 from which the fluid discharges from the accelerator.

In order to raise the fluid to supersonic speed before it enters the mechanical accelerator, any known means may be provided. As indicated in FIGURE 1, this initial supersonic velocity of the fluid may be obtained by passing it through a compressor 24 and a preheater 26 which may be of the well known pebble bed type. The thus compressed and heated fluid is then expanded through the nozzles 28 to supersonic velocity, and it then impinges on the vanes of the first rotor stage.

The actual passage of the fluid flow through the various stages of the mechanical accelerator will be explained with reference to FIGURES 2 and 3. As indicated in this figure, adjacent stages are driven in opposite directions at the same rotational velocity. The vanes of each rotor are substantially similar to each other, and it will be noted that each vane is effective to turn the fluid through a substantial angle. The nozzles 28 shown at the left of FIGURE 2 inject the fluid into the vanes of the first stage rotor at an angle of $\theta_0$ to the axis of the accelerator. The velocity of the fluid at this point is indicated by the vector $V_{1A}$ in the vector diagram of FIGURE 3. This velocity must be assumed to be supersonic. The vector $V_t$ also shown in FIGURE 3 represents the velocity of the first stage rotor. As the fluid leaves the stator nozzles 28, it enters the first stage accelerator rotor and is subsequently turned through a large angle at an essentially constantly static pressure and temperature. Since there is an increase in the absolute flow velocity of the gas leaving the rotor while the static conditions remain the same, the effective stagnation temperature and stagnation pressure of the fluid increase. If the relative angular inclination of the flow entering the blade passage is denoted by $\theta_1$, and the corresponding exit flow by $\theta_2$, the vector diagram of FIGURE 2 gives the velocities in question with the subscripts A and R denoting the absolute and relative coordinate system respectively. The flow leaves the stators at a relative velocity $V_{1R}$ whose magnitude is determined according to the formula:

$$V^2{}_{1R} = V^2{}_{1A} + V^2{}_t + 2V_{1A}V_t \sin \theta_0$$

The fluid travels through the blade passage with substantially no change in static pressure and temperature. Since the local Mach number is high, the corresponding change in relative flow velocity across the stage is quite small. The flow direction, however, has changed by an amount equal to $\theta_1 + \theta_2$ which angle is the total flow turning angle of the blade passage. In order to determine the absolute velocity of the fluid leaving the first stage rotor, therefore, the lower half of the velocity diagram of FIGURE 3 is used. Since the relative velocity leaving the passage is in the same direction as the blade rotation, the absolute velocity leaving the system has increased in comparison with the absolute entrance velocity. This may be represented by the following formula:

$$V^2{}_{2A} = V^2{}_{2R} + V^2{}_t + 2V_{2R}V_t \sin \theta_2$$

It is apparent from the above formulas that the larger total turning angles will produce larger velocity increments across each stage. As a compromise between maximum performance and feasibility of blade construction, a total turning angle of 120° is believed to be desirable. Therefore, if $$\theta_1 \cong \theta_2 \cong 60°$$

then $$\frac{V_{2A}}{V_{1A}} \cong 1 + 1.75 \frac{V_t}{V_{1A}}$$

The advantages of this type of accelerator over those using magnetic or electric fields is believed to be readily apparent to those skilled in the art. Since no ionization of the test fluid is required, the gas is essentially in chemical and thermodynamic equilibrium. In addition, the radiation loses are negligible because the gas has been expanded from its initial stagnation state to a relatively low static temperature. The accelerator, therefore, can be operated as a second stage of either a pebble bed, electrical resistance or arc heater.

From the foregoing description, it is believed that those skilled in the art will readily recognize that there is herein shown and described a new and useful method and apparatus for the high Mach number acceleration of fluids. Applicant claims the benefit of a full range of equivalents within the scope of the appended claims:

I claim:

1. Apparatus for accelerating air or other fluids to supersonic velocities of the order of Mach 15 to Mach 30 at substantially constant static temperatures and pressures comprising:

a housing having a fluid inlet and a fluid outlet positioned at opposite ends thereof;

a vaned rotor in said housing, the vanes of said rotor being shaped and positioned to turn fluid impinging thereon through an angle greater than 90°;

means for positively driving said rotor;

and means including a nozzle for injecting fluid at supersonic velocity through said inlet and into the vanes of said rotor.

2. Apparatus for accelerating air or other fluids to supersonic velocities of the order of Mach 15 to Mach 30 at substantially constant static temperatures and pressures comprising:

a housing having a fluid inlet and a fluid outlet at opposite ends thereof;

a plurality of vaned rotors in said housing in axial alignment with each other, the vanes on each of said rotors being shaped and positioned to turn the fluid impinging thereon through an angle greater than about 90°;

means for positively driving adjacent ones of said rotors in opposite directions;

and means including a nozzle for injecting fluid at supersonic velocity through said inlet and into the vanes of the first of said rotors.

3. Apparatus as defined by claim 1 in which said means for injecting fluid at supersonic velocity through said inlet includes a compressor and a preheater connected in series.

4. Apparatus for accelerating air or other fluids to supersonic velocities of the order of Mach 15 to Mach 30 at substantially constant static temperature and pressure comprising:

a housing having a fluid inlet and a fluid outlet positioned at opposite ends thereof;

a plurality of vaned rotors rotatably mounted adjacent each other in said housing, in axial alignment with each other, the vanes on each of said rotors being shaped and positioned to turn the fluid impinging thereon through an angle greater than 90°;

means for positively driving adjacent ones of said rotors in opposite directions and at substantially equal rotational velocity;

and means including a compressor and a preheater connected in series with an expansion nozzle, said nozzle being positioned to inject fluid into the vanes of the first rotor stage at an angle of approximately 60° to the axis of said rotors, said means being effective to inject the fluid at supersonic velocity.

5. The method of accelerating a fluid to Mach number greater than about 15 comprising:

(1) compressing the fluid, heating the fluid and then expanding the fluid to a supersonic velocity;

(2) and increasing the velocity of the fluid beyond said supersonic speed by turning the fluid through an angle greater than about 90° in a confined path while maintaining the fluid at substantially constant static temperature and static pressure.

6. The method of accelerating fluid to Mach numbers greater than about 15 comprising:

(1) compressing the fluid, heating the fluid, and then expanding the fluid to a supersonic velocity;

(2) and increasing the velocity of the fluid beyond said supersonic speed by turning the fluid through an angle greater than about 90° in a confined path in contact with a rapidly-moving rotating body while maintaining the fluid at substantially constant static temperature and static pressure.

References Cited by the Examiner

UNITED STATES PATENTS

| | | | |
|---|---|---|---|
| 2,426,270 | 8/1947 | Howell | 230—123 |
| 2,611,532 | 9/1952 | Ljungstrom | 230—123 |
| 2,689,681 | 9/1954 | Sabatiuk | 230—120 |
| 2,776,562 | 1/1957 | Davie et al. | 73—147 |
| 2,799,159 | 7/1957 | Sabol | 73—147 |
| 2,937,523 | 5/1960 | Yoler | 73—147 |
| 2,948,148 | 8/1960 | Anfreville et al. | 73—147 |
| 2,955,747 | 10/1960 | Schwaar | 230—123 |

FOREIGN PATENTS

| | | |
|---|---|---|
| 815,268 | 4/1937 | France. |
| 64,092 | 8/1892 | Germany. |
| 458,166 | 6/1950 | Italy. |

DONLEY J. STOCKING, *Primary Examiner.*

HENRY F. RADUAZO, *Examiner.*